(12) United States Patent
Hu et al.

(10) Patent No.: US 11,057,087 B2
(45) Date of Patent: Jul. 6, 2021

(54) MOBILE OBJECT AND ANTENNA AUTOMATIC ALIGNMENT METHOD AND SYSTEM THEREOF

(71) Applicant: SZ DJI TECHNOLOGY CO., LTD., Shenzhen (CN)

(72) Inventors: Meng Hu, Shenzhen (CN); Peng Xie, Shenzhen (CN); Tao Zhao, Shenzhen (CN); Jianping Wei, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/730,185

(22) Filed: Dec. 30, 2019

(65) Prior Publication Data
US 2020/0136695 A1 Apr. 30, 2020

Related U.S. Application Data

(63) Continuation of application No. 16/032,432, filed on Jul. 11, 2018, now Pat. No. 10,523,293, which is a
(Continued)

(51) Int. Cl.
*H04B 7/06* (2006.01)
*B64C 39/02* (2006.01)
(Continued)

(52) U.S. Cl.
CPC ......... *H04B 7/0608* (2013.01); *B64C 39/024* (2013.01); *H04B 7/0802* (2013.01);
(Continued)

(58) Field of Classification Search
CPC .. H04B 7/0608; H04B 7/0802; H04B 7/0834; B64C 39/024; B64C 2201/141;
(Continued)

(56) References Cited

U.S. PATENT DOCUMENTS

| 4,929,958 A | 5/1990 | Hodel et al. |
| 7,162,261 B1 | 1/2007 | Yarkosky et al. |

(Continued)

FOREIGN PATENT DOCUMENTS

| CN | 1515914 A | 7/2004 |
| CN | 1605165 A | 4/2005 |

(Continued)

OTHER PUBLICATIONS

Li-Lian Huang et al., Three dimension MIMO channel modeling and simulation analysis based on UAV, Systems Engineering and Electronics, May 2015, pp. 1184-1189, vol. 37, No. 5.
(Continued)

*Primary Examiner* — Cassi J Galt
(74) *Attorney, Agent, or Firm* — Anova Law Group, PLLC

(57) ABSTRACT

A UAV system includes a remote controller including two first antennas and a UAV including two second antennas arranged at two landing stands of the UAV, respectively. The two first antennas and the two second antennas are configured to establish a 2×2 MIMO communication link. The remote controller is configured to transmit current terminal position information of the remote controller to the UAV via the 2×2 MIMO communication link. The UAV determines current remote controller relative position information of the remote controller relative to the UAV according to the current terminal position information and current UAV position information acquired via a position sensor, and controls communication between the UAV and the remote controller according to the current remote controller relative position information.

19 Claims, 19 Drawing Sheets

Related U.S. Application Data continuation of application No. 15/638,736, filed on Jun. 30, 2017, now Pat. No. 10,516,454, which is a continuation of application No. PCT/CN2014/095757, filed on Dec. 31, 2014.

(51) Int. Cl.
*H04B 7/08* (2006.01)
*H04W 4/21* (2018.01)
*H04W 4/80* (2018.01)
*H04L 29/06* (2006.01)

(52) U.S. Cl.
CPC ........ *H04L 69/24* (2013.01); *B64C 2201/146* (2013.01); *H04W 4/21* (2018.02); *H04W 4/80* (2018.02)

(58) Field of Classification Search
CPC ........ B64C 2201/146; B64C 2201/108; B64C 2201/187; B64C 25/52; B64C 13/20
See application file for complete search history.

(56) References Cited

U.S. PATENT DOCUMENTS

| | | | |
|---|---|---|---|
| 9,696,725 | B2 | 7/2017 | Wang |
| 2009/0125221 | A1 | 5/2009 | Estkowski et al. |
| 2009/0295635 | A1 | 12/2009 | Smoot et al. |
| 2010/0330940 | A1* | 12/2010 | Sheynblat ............... H01Q 1/242 455/129 |
| 2011/0298679 | A1 | 12/2011 | Elliot et al. |
| 2011/0301784 | A1 | 12/2011 | Oakley et al. |
| 2012/0155562 | A1 | 6/2012 | Lucidarme |
| 2012/0200458 | A1 | 8/2012 | Jalali et al. |
| 2012/0313820 | A1 | 12/2012 | Tyree |
| 2015/0102154 | A1 | 4/2015 | Duncan et al. |
| 2015/0229382 | A1 | 8/2015 | Lee et al. |
| 2015/0237569 | A1 | 8/2015 | Jalali |

FOREIGN PATENT DOCUMENTS

| | | |
|---|---|---|
| CN | 101075837 A | 11/2007 |
| CN | 201315343 Y | 9/2009 |
| CN | 101631379 A | 1/2010 |
| CN | 101867401 A | 10/2010 |
| CN | 101969497 A | 2/2011 |
| CN | 201910852 U | 7/2011 |
| CN | 102147462 A | 8/2011 |
| CN | 202094279 U | 12/2011 |
| CN | 202257276 U | 5/2012 |
| CN | 202257283 U | 5/2012 |
| CN | 102519600 A | 6/2012 |
| CN | 102598406 A | 7/2012 |
| CN | 103281108 A | 9/2013 |
| CN | 103607231 A | 2/2014 |
| CN | 103957018 A | 7/2014 |
| CN | 104143693 A | 11/2014 |
| CN | 203921192 U | 11/2014 |
| JP | S49112589 A | 10/1974 |
| JP | H07321534 A | 12/1995 |
| JP | H08160128 A | 6/1996 |
| JP | H09133749 A | 5/1997 |
| JP | 2007106268 A | 4/2007 |
| JP | 2007214759 A | 8/2007 |
| JP | 2007235649 A | 9/2007 |
| JP | 2009182403 A | 8/2009 |
| JP | 2012112738 A | 6/2012 |
| JP | 2012216921 A | 11/2012 |
| JP | 2013179497 A | 9/2013 |
| JP | 2013539290 A | 10/2013 |
| WO | 2004093416 A1 | 10/2004 |
| WO | 2006104158 A1 | 10/2006 |
| WO | 2013090716 A1 | 6/2013 |

OTHER PUBLICATIONS

Zheng Tan and Xiaolin Zhang, Modeling and performance analysis of multiple-antennae communication channel for pilotless helicopter, Journal of Beijing University of Aeronautics and Astronautics, Oct. 2010, pp. 1171-1175, vol. 35, No. 10.

The World Intellectual Property Organization (WIPO) International Search Report and Written Opinion for PCT/CN2014/095757 dated Sep. 23, 2015 8 Pages.

Weijun Zhu, MIMO Systems for Military Communications, 2006 IEEE Military Communications Conference, Oct. 2006.

Parrot BEBOP Drone: Take Aerial Video and Pictures like a Pro!, May 12, 2014 http://cdn0.vox-cdn.com/assets/4438735/FINAL_Parrot_BeBop_Drone_USA.pdf.

* cited by examiner

MOBILE OBJECT AND ANTENNA AUTOMATIC ALIGNMENT METHOD AND SYSTEM THEREOF

CROSS-REFERENCE TO RELATED APPLICATIONS

This is a continuation application of U.S. application Ser. No. 16/032,432, filed on Jul. 11, 2018, which is a continuation application of U.S. application Ser. No. 15/638,736, filed on Jun. 30, 2017, now U.S. Pat. No. 10,516,454, which is a continuation application of International Application No. PCT/CN2014/095757, filed on Dec. 31, 2014, the entire contents of all of which are incorporated herein by reference.

TECHNICAL FIELD

The present disclosure relates to an antenna alignment method, and in particular, to a mobile object and an antenna automatic alignment method and system thereof.

BACKGROUND

Control and data transmission of existing general commercial unmanned aerial vehicles are mainly in a point-to-point transmission mode, which is divided into a ground end and an aerial vehicle end. The ground end mainly accomplishes remotely controlling an aerial vehicle, receiving and processing data returned by the aerial vehicle end and other work, while the aerial vehicle end mainly flies in accordance with an instruction from the ground end, and sends corresponding data to the ground end in accordance with the instruction from the ground end. The ground end and the aerial vehicle end form a point-to-point communication link, and stability and reliability of the communication link play an important part in safe and controllable flight of the aerial vehicle and data return.

In order to increase the stability and reliability of the communication link, it is necessary to increase communication system gain therebetween and maintain stability of the system gain as much as possible. A calculation formula of the system gain GSYS is as follows: GSYS=PT+GT+GR−PSEN, wherein PT is transmitted power, GT is the gain of a transmitting antenna, GR is the gain of a receiving antenna, and PSEN is receiving sensitivity of a receiving end.

At two ends of the unmanned aerial vehicle, the transmitted power and the receiving sensitivity will remain about the same, and the stability is relatively high. However, the actual relative gain of the receiving and transmitting antennas will vary with relative positions and orientations therebetween. Then, it can be seen from the aforementioned calculation formula of the system gain GSYS that, in order to maintain the stability of the system gain, the receiving and transmitting antennas need to be arranged in the maximum gain direction of the opposite side.

At present, in order to ensure alignment of the receiving and transmitting antennas, it is common to adopt a manner of a servo gimbal. Positions of the antennas are dynamically adjusted in accordance with the orientation of the opposite side or received signal strength, and there are such patents, domestic or foreign, covering this field. For example, a Chinese Patent of which the patent number is CN 202257283 U and the title of the disclosure is "AUTOMATIC TRACKING ANTENNA DEVICE AND MOBILE TERMINAL." This Chinese Patent, on the basis of a servo gimbal and an electronic compass, automatically lets an antenna similar to a vehicle-mounted GPS to be aligned with the satellite. However, the structure of the automatic tracking antenna device of the Chinese Patent is relatively complicated, has a greater volume, and is not suitable for wireless communication in the field of unmanned aerial vehicles at all.

SUMMARY

In view of this, in the present disclosure, it is necessary to provide an antenna automatic alignment method of a mobile object, and the antenna automatic alignment method facilitates simplification of the structure of antennas and miniaturization of the volume thereof.

An antenna automatic alignment method of a mobile object, wherein the mobile object includes a plurality of antennas used for establishing a communication link with a wireless terminal, and the method includes the following steps:

acquiring, in real time, current feature information of the plurality of antennas, the plurality of antennas including spare antennas; and selecting an antenna available for current communication in accordance with the current feature information of the plurality of antennas.

According to the aforementioned antenna automatic alignment method, a plurality of antennas including spare antennas are disposed on a mobile object, and through current feature information of the plurality of antennas acquired in real time, antennas used in communication are switched, to keep sending and receiving antennas not blocked all the time, so as to maintain stability and reliability of communication. In the aforementioned antenna automatic alignment method, it is not necessary to use a servo gimbal with a greater volume, so that the antennas have a small volume, are lightweight, simpler in structure, and very suitable for mobile objects.

At the same time, based on the aforementioned antenna automatic alignment method, the present disclosure further provides an antenna automatic alignment system.

An antenna automatic alignment system of a mobile object, wherein the mobile object includes a plurality of antennas used for establishing a communication link with a wireless terminal, and the antenna automatic alignment system includes:

a feature information acquisition module used for acquiring, in real time, current feature information of the plurality of antennas, the plurality of antennas including spare antennas; and an antenna selection module used for selecting an antenna available for current communication in accordance with the current feature information of the plurality of antennas.

In addition, the present disclosure further provides a mobile object to which the aforementioned antenna automatic alignment method is applied.

A mobile object, including:

a plurality of antennas used for establishing a communication link with a wireless terminal, the plurality of antennas including spare antennas;

a feature information acquisition device used for acquiring, in real time, current feature information of the plurality of antennas; and a controller in communication connection with the plurality of antennas and the feature information acquisition device, used for selecting an antenna available for current communication in accordance with the current feature information of the plurality of antennas.

Based on the aforementioned antenna automatic alignment method, the present disclosure further provides a controller used for performing the calculation, judgment, selection and other steps in the aforementioned antenna automatic alignment method.

A controller used for controlling a plurality of antennas of a mobile object, the plurality of antennas being used for establishing a communication link with a wireless terminal, and the plurality of antennas including spare antennas, wherein the controller is configured to: select an antenna available for current communication in accordance with current feature information of the plurality of antennas.

DETAILED DESCRIPTION OF THE EMBODIMENTS

Figure 1:
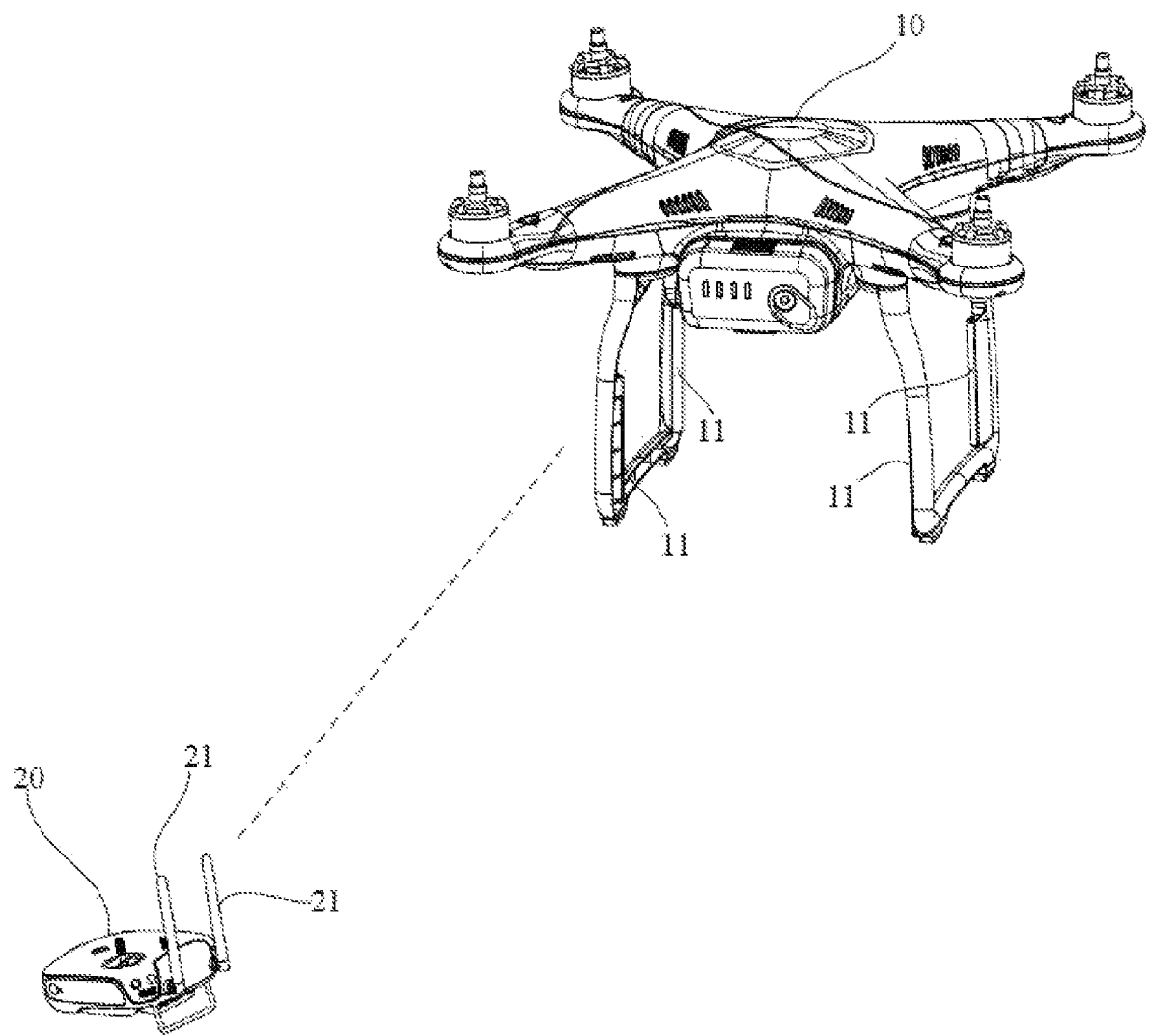
FIG. 1 is a schematic diagram of an antenna automatic alignment method according to an implementation manner of the present disclosure.

Technical solutions of the present disclosure will be described with reference to the drawings. It will be appreciated that embodiments as described in the disclosure are a part rather than all of the embodiments of the present disclosure. Other embodiments, which are conceived by those having ordinary skills in the art on the basis of the disclosed embodiments without inventive efforts, should fall within the scope of the present disclosure.

It should be noted that when one assembly is referred to as "be fixed to" another assembly, it may be directly on the another assembly or it is also possible that there is an assembly between them. When one assembly is considered to "connect" another assembly, it may be directly connected to the another assembly or it is also possible that there is an assembly between them. The terms "perpendicular", "horizontal", "left", "right" and similar expressions used herein are merely intended for description.

Unless otherwise defined, all the technical and scientific terms used herein are the same as the meanings generally understood by persons skilled in the technical field of the present disclosure. Herein, the terms used in the specification of the present disclosure are intended to describe specific embodiments, instead of limiting the present disclosure. The term "and/or" used herein includes any combination and all combinations of one or more related items listed.

In an implementation manner of the present disclosure, an antenna automatic alignment method of a mobile object is provided, wherein the mobile object includes a plurality of antennas used for establishing a communication link with a wireless terminal, and the plurality of antennas include spare antennas. The method selects an antenna available for current communication by acquiring, in real time, current feature information of the plurality of antennas and according to the current feature information of the plurality of antennas. For example, it is feasible to, in accordance with the current feature information of the plurality of antennas, select an antenna currently aligned with the wireless terminal and take the selected antenna as an antenna of current communication.

In some embodiments, the mobile object may be a ground mobile object, for example, a ground remote control tank or the like; and may also be an aerial mobile object, for example, an unmanned aerial vehicle or the like. The unmanned aerial vehicle may be a fixed wing unmanned aerial vehicle, a rotor unmanned aerial vehicle or the like. The wireless terminal may be a ground wireless terminal, for example, a UAV ground base station, a remote controller or the like, and may also be an aerial wireless terminal, for example, a UAV aerial base station, other aerial vehicles or the like.

In some embodiments, the antennas may be WiFi antennas, worldwide interoperability for microwave access (WiMAX) antennas, coded orthogonal frequency-division multiplexing (COFDM) antennas and the like.

In some embodiments, the current feature information may be signal state information of the antennas, for example, signal power of the antennas, signal strength of the antennas, signal quality of the antennas and the like, and may also be relative position information of the antennas relative to the wireless terminal, for example, current position information of the plurality of antennas relative to the mobile object, current position information of the wireless terminal relative to the mobile object and the like.

Based on the aforementioned antenna automatic alignment method, the present disclosure further provides an antenna automatic alignment system of a mobile object.

Based on the aforementioned antenna automatic alignment method, the present disclosure further provides a mobile object. The mobile object includes: a feature information acquisition device used for acquiring, in real time, current feature information of the plurality of antennas, and a controller in communication connection with the wireless circuit module and the feature information acquisition device and used for selecting an antenna available for current communication in accordance with the current feature information of the plurality of antennas.

In some embodiments, the feature information acquisition device includes at least one of the followings: an attitude sensor used for acquiring current attitude information of the mobile object, a positioning sensor used for acquiring, in real time, current absolute position information of the mobile object and/or the mobile terminal, and a wireless circuit module used for scanning signal power of the plurality of antennas.

Some implementation manners of the present disclosure are described below in detail with reference to the accompanying drawings. In the event of no conflict, the embodiments described below and features in the embodiments can be combined with each other.

Referring to FIG. 1, an antenna automatic alignment method according to a first implementation manner of the present disclosure is applied to a mobile object 10, the mobile object 10 including a plurality of antennas 11 used for establishing a communication link with a wireless terminal 20. In some embodiments, as shown in FIG. 1, the antennas 11 are disposed at U-shaped landing stands of the mobile object 10.

The mobile object 10 may be an aerial mobile object, a ground mobile object or the like. The wireless terminal 20 may be a ground wireless terminal, an aerial wireless terminal or the like, and the antennas 11 may be WiFi antennas, worldwide interoperability for microwave access (WiMAX) antennas, coded orthogonal frequency-division multiplexing (COFDM) antennas and the like. In the embodiments described below, description is given by taking that the mobile object 10 is an unmanned aerial vehicle as an example, by taking that the wireless terminal 20 is a remote controller as an example, and by taking that the communication link is a multi-input-multi-output (MIMO) communication link as an example.

Figure 3:
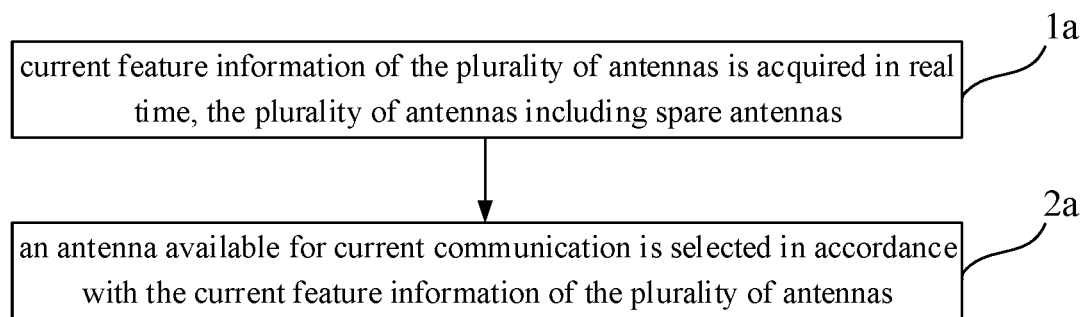
FIG. 3 is a flow chart of an antenna automatic alignment method according to a first implementation manner of the present disclosure.

Referring to FIG. 3, the antenna automatic alignment method includes steps 1a-2a.

Step 1a, current feature information of the plurality of antennas 11 is acquired in real time, the plurality of antennas 11 including spare antennas.

The current feature information includes at least one of the followings: signal state information of the antennas 11, or relative position information of the antennas 11 relative to the wireless terminal 20. The current feature information may include current position information of the plurality of antennas 11 relative to the mobile object 10, current position information of the wireless terminal 20 relative to the mobile object 10 and the like. The signal state information may be signal power of the antennas 11, signal strength of the antennas 11, signal quality of the antennas 11 and the like.

Figure 4:
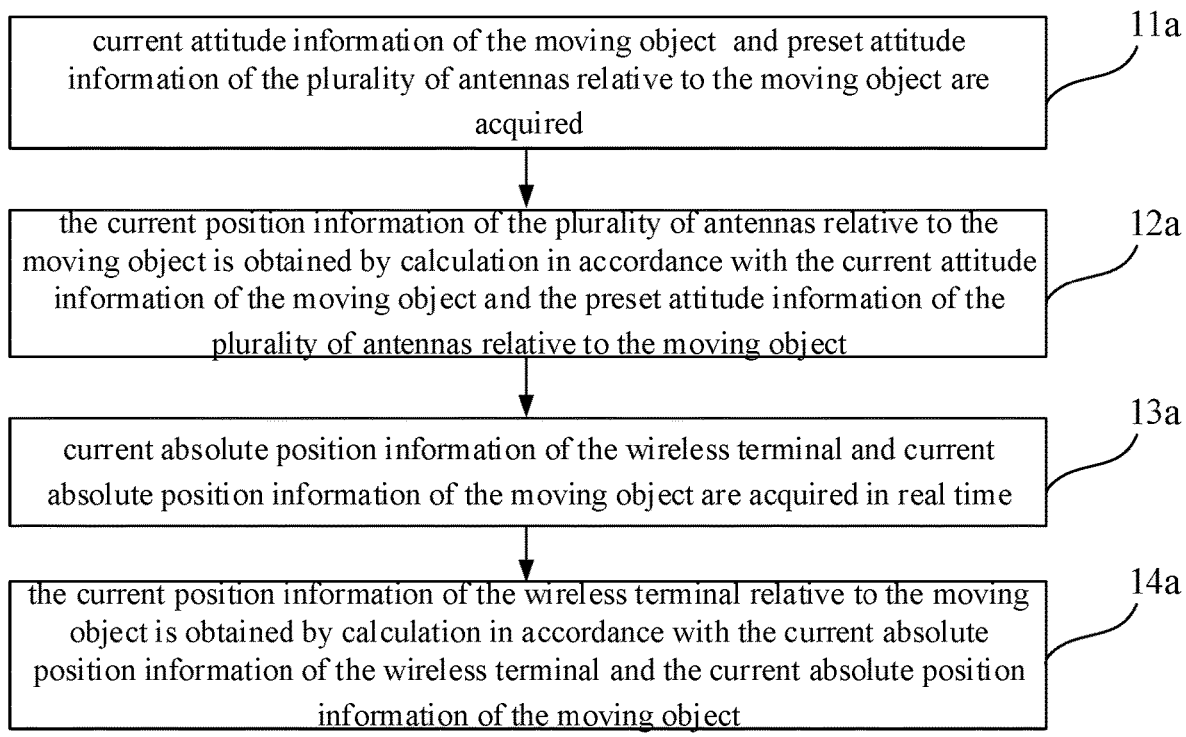
FIG. 4 is a flow chart of one embodiment of step S1*a* of the antenna automatic alignment method shown in FIG. 3.

Referring to FIG. 4, in an embodiment, the current feature information is relative position information of the plurality of antennas 11 relative to the wireless terminal 20, which may include current position information of the plurality of antennas 11 relative to the mobile object 10 and current position information of the wireless terminal 20 relative to the mobile object 10. Correspondingly, step 1a specifically includes the following steps:

Step 11a, current attitude information of the mobile object 10 and preset attitude information of the plurality of antennas 11 relative to the mobile object 10 are acquired.

Figure 2:
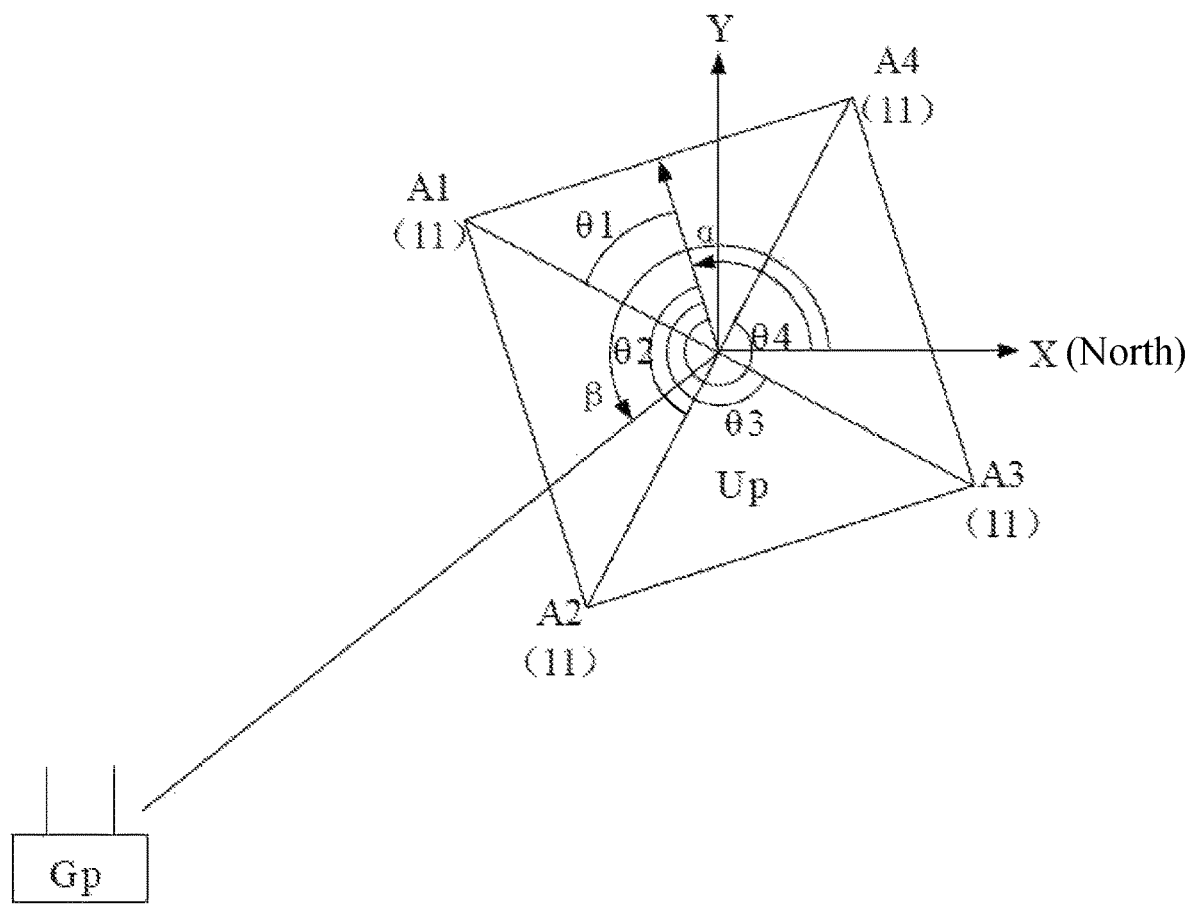
FIG. 2 is a schematic diagram of the principle of the antenna automatic alignment method shown in FIG. 1.

Referring to FIG. 2 together, specifically, in the embodiment illustrated, during a flight of an unmanned aerial vehicle, an angle between a due north direction and the head is a yaw angle $\alpha$, wherein the clockwise direction is positive, the counterclockwise direction is negative, and the yaw angle $\alpha$ ranges from −180° to 180°.

The unmanned aerial vehicle is taken as a coordinate system. That is, a horizontal coordinate system (not shown) is established by taking a connection line between the head and the tail as an X axis and taking a connection line between the left side and the right side of the unmanned aerial vehicle as a Y axis respectively. Four groups of antennas 11 on the unmanned aerial vehicle are respectively A1-A4, $\theta 1$, $\theta 2$, $\theta 3$, and $\theta 4$ are respectively horizontal angles between the four antennas A1-A4 on the unmanned aerial vehicle and the head direction of the unmanned aerial vehicle. Specifically, the four antennas A1-A4 are respectively mounted on four corners at 45°, 135°, 225°, and 315° on the unmanned aerial vehicle. As the four antennas A1-A4 are located on four corners of the unmanned aerial vehicle, it is ensured that, no matter what attitude and heading the unmanned aerial vehicle is in, there are always two antennas 11 not blocked by the vehicle body and forming visual range communication with the wireless terminal 20.

Step 12a, the current position information of the plurality of antennas 11 relative to the mobile object 10 is obtained by calculation in accordance with the current attitude information of the mobile object 10 and the preset attitude information of the plurality of antennas 11 relative to the mobile object 10.

Specifically, in the embodiment illustrated, a coordinate system is established by taking the geometric center of the unmanned aerial vehicle as the origin, a north-south direction as an X axis (the north is a positive direction), and an east-west direction as a Y axis (the west is a positive direction). The locations of the four antennas A1-A4 of the unmanned aerial vehicle and the position of the wireless terminal 20 are equivalent to four vector points on the plane coordinate system. Under the coordinate system, angles between the four antennas A1-A4 and the X axis are respectively $\alpha+\theta 1$, $\alpha+\theta 2$, $\alpha+\theta 3$, and $\alpha+\theta 4$.

When the current position information of the wireless terminal 20 can be acquired in real time, for example, the wireless terminal 20 is provided thereon with a positioning sensor such as a GNSS, step 1a further specifically includes:

Step 13a, current absolute position information of the wireless terminal 20 and current absolute position information of the mobile object 10 are acquired in real time.

Specifically, in the embodiment illustrated, during the flight of the unmanned aerial vehicle, an absolute position of the wireless terminal 20 is Gp, an absolute position of the mobile object 10 is Up, and their absolute positions are both acquired by a positioning sensor.

Step 14a, the current position information of the wireless terminal 20 relative to the mobile object 10 is obtained by calculation in accordance with the current absolute position information of the wireless terminal 20 and the current absolute position information of the mobile object 10.

Specifically, in the embodiment illustrated, in the coordinate system which takes the geometric center of the unmanned aerial vehicle as the origin, a north-south direction as an X axis (the north is a positive direction), and an east-west direction as a Y axis (the west is a positive direction), an angle between a vector of the location of the wireless terminal 20 and the X axis is $\beta$.

Figure 5:
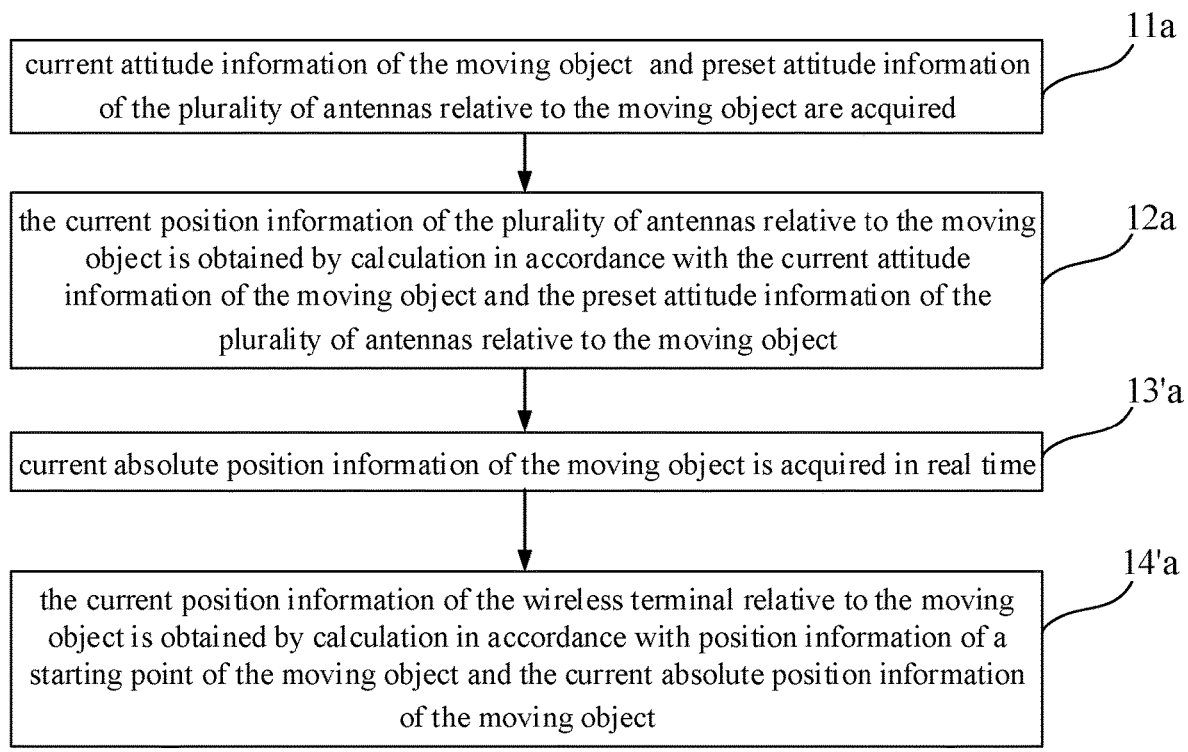
FIG. 5 is a flow chart of another embodiment of step 1*a* of the antenna automatic alignment method shown in FIG. 3.

Referring to FIG. 5, when the current position information of the wireless terminal 20 cannot be acquired in real time, step 1*a* further specifically includes:

step 13'*a*, current absolute position information of the mobile object 10 is acquired in real time; and step 14'*a*, the current position information of the wireless terminal 20 relative to the mobile object 10 is obtained by calculation in accordance with position information of a take-off point of the mobile object 10 and the current absolute position information of the mobile object 10.

It should be noted that, if the mobile object 10 is an unmanned aerial vehicle, the take-off point of the mobile object 10 is a takeoff point of the unmanned aerial vehicle.

Step 2*a*, an antenna 11 available for current communication is selected in accordance with the current feature information of the plurality of antennas 11.

Figure 6:
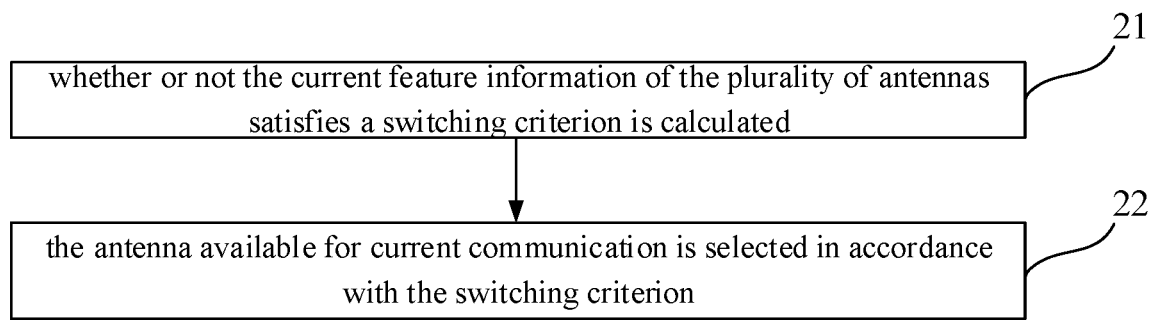
FIG. 6 is a flow chart of one embodiment of step 2*a* of the antenna automatic alignment method shown in FIG. 3.

Referring to FIG. 6, step 2*a* specifically includes:

Step 21, whether or not the current feature information of the plurality of antennas 11 satisfies a switching criterion is calculated.

The switching criterion includes at least one of the followings: selecting an antenna 11, of which the current feature information has a greater value, in the plurality of antennas 11, selecting an antenna 11, of which the current feature information has a smaller value, in the plurality of antennas 11, or selecting an antenna 11, of which the current feature information satisfies a threshold range, in the plurality of antennas 11.

Each kind of current feature information corresponds to one switching criterion, or multiple kinds of current feature information correspond to the same switching criterion. Whether or not the current feature information of the plurality of antennas 11 satisfies a corresponding switching criterion is calculated. The switching criterion may be set in accordance with a rule of current feature information of an antenna 11, which is aligned with the wireless terminal 20, in the plurality of antennas 11.

Step 22, the antenna 11 available for current communication is selected in accordance with the switching criterion.

Specifically, in accordance with a result of calculating whether or not the current feature information of the plurality of antennas 11 satisfies a corresponding switching criterion, an antenna 11 of which the current feature information satisfies the corresponding switching criterion is selected as a current communication antenna.

Figure 7:
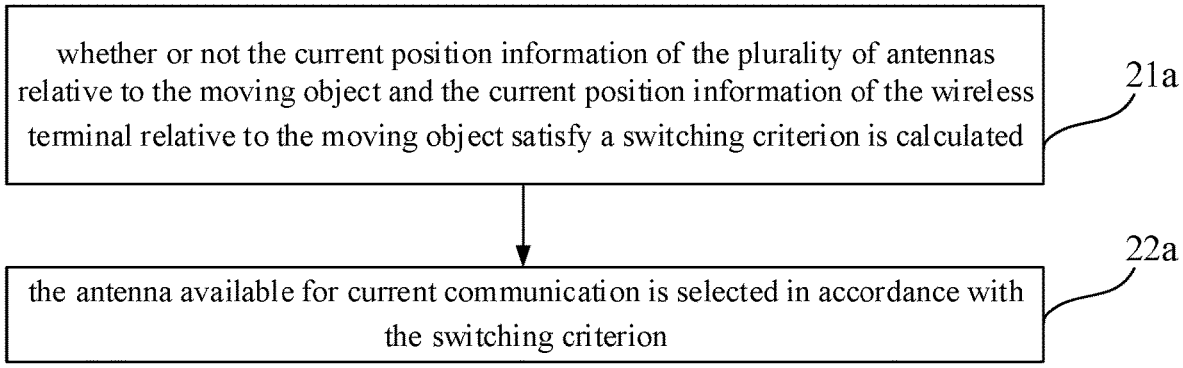
FIG. 7 is a specific flow chart of the antenna automatic alignment method shown in FIG. 6.

In an embodiment, the current feature information is relative position information of the plurality of antennas 11 relative to the wireless terminal 20, which may include current position information of the plurality of antennas 11 relative to the mobile object 10, and current position information of the wireless terminal 20 relative to the mobile object 10. Referring to FIG. 7, corresponding to the feature information, step 2*a* specifically includes:

Step 21*a*, whether or not the current position information of the plurality of antennas 11 relative to the mobile object 10 and the current position information of the wireless terminal 20 relative to the mobile object 10 satisfy a switching criterion is calculated.

Figure 8:
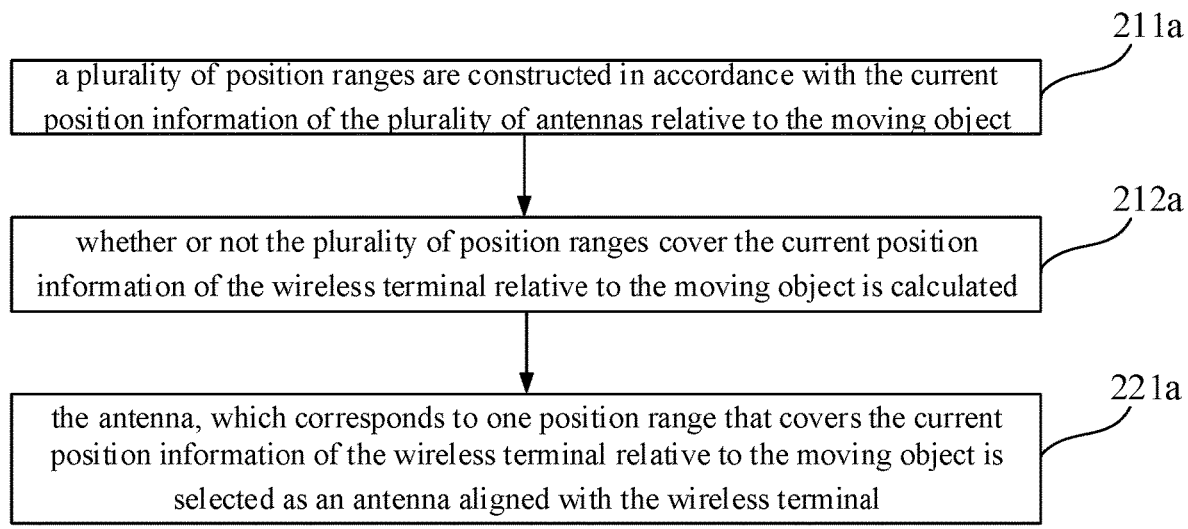
FIG. 8 is a specific flow chart of step 21*a* and step 22*a* of the antenna automatic alignment method shown in FIG. 7.

Referring to FIG. 8, in an embodiment, step 21*a* specifically includes:

Step 211*a*, a plurality of position ranges are constructed in accordance with the current position information of the plurality of antennas 11 relative to the mobile object.

Specifically, in the embodiment illustrated, in accordance with current angle positions $\alpha+\theta 1$, $\alpha+\theta 2$, $\alpha+\theta 3$, and $\alpha+\theta 4$ of the four antennas A1-A4 relative to the unmanned aerial vehicle, four threshold ranges $(\alpha+\theta 1+360)$ mod 360, $(\alpha+\theta 2+360)$ mod 360, $(\alpha+\theta 3+360)$ mod 360, and $(\alpha+\theta 4+360)$ mod 360 are constructed, wherein mod is a remainder function.

Step 212*a*, whether or not the plurality of position ranges cover the current position information of the wireless terminal 20 relative to the mobile object 10 is calculated.

Specifically, the switching criterion is: the antenna 11, which corresponds to one position range that covers the current position information of the wireless terminal 20 relative to the mobile object 10, is an antenna 11 aligned with the wireless terminal 20.

In accordance with the switching criterion, whether or not the current position information of the wireless terminal 20 relative to the mobile object 10 is within the plurality of position ranges constructed by the current position information of the plurality of antennas 11 is calculated.

Specifically, in the embodiment illustrated, which one of the four threshold ranges $(\alpha+\theta 1+360)$ mod 360, $(\alpha+\theta 2+360)$ mod 360, $(\alpha+\theta 3+360)$ mod 360, and $(\alpha+\theta 4+360)$ mod 360 the relative angle $\beta$ of the wireless terminal relative to the mobile object 10 falls within is calculated.

Step 22*a*, the antenna 11 available for current communication is selected in accordance with the switching criterion.

Specifically, in accordance with the switching criterion, step 22*a* specifically includes:

Step 221*a*, the antenna 11, which corresponds to one position range that covers the current position information of the wireless terminal 20 relative to the mobile object 10 is selected as an antenna 11 aligned with the wireless terminal 20.

Specifically, in the embodiment illustrated, in accordance with a relationship of whether the relative angle $\beta$ falls within the four threshold ranges $(\alpha+\theta 1+360)$ mod 360, $(\alpha+\theta 2+360)$ mod 360, $(\alpha+\theta 3+360)$ mod 360, and $(\alpha+\theta 4+360)$ mod 360, the antenna 11 aligned with the wireless terminal 20 therein is selected. For example:

(1) when $(\alpha+\theta 1+360)$ mod $360 < \beta \leq (\alpha+\theta 2+360)$ mod 360, the antennas A1 and A2 are selected;

(2) when $(\alpha+\theta 2+360)$ mod $360 < \beta \leq (\alpha+\theta 3+360)$ mod 360, the antennas A2 and A3 are selected;

(3) when $(\alpha+\theta 3+360)$ mod $360 < \beta \leq (\alpha+\theta 4+360)$ mod 360, the antennas A3 and A4 are selected; and (4) when $(\alpha+\theta 4+360)$ mod $360 < \beta \leq 0$ or $0 < \beta \leq (\alpha+\theta 1+360)$ mod 360, the antennas A4 and A1 are selected.

Further, the position ranges include a coordinate range that takes the current position information of the plurality of antennas 11 relative to the mobile object 10 as an end point and a preset protection range. The preset protection range is used for preventing that coordinate positions of the plurality of antennas 11 at antenna end points are frequently switched, which is easy to lead to communication interrupt.

Specifically, in the embodiment illustrated, in order to avoid the problem of frequent switching at a junction, it is necessary to set a dead-zone protection angle $\gamma$ at the junction. For example, the dead-zone protection angle $\gamma$ is 10°, and antenna switching is carried out only after the aforementioned angle is beyond the dead-zone protection angle.

For example, at a certain moment, the antennas A1 and A2 are used. Next, with movement of the aerial vehicle, at next moment, a relationship between the yaw angle α and the relative angle θ is as follows:

(α+θ1+360) mod 360<β≤(α+θ2+360) mod 360+γ;

At this point, the antennas A1 and A2 are still used, and will be switched to the antennas A2 and A3 only when (α+θ2+360) mod 360+γ<β≤(α+θ3+360) mod 360.

Next, at the next moment, if (α+θ2+360) mod 360−γ<β≤(α+θ3+360) mod 360, the antennas A2 and A3 are still used, which will be switched back once again to the antennas A1 and A2 only when (α+θ1+360) mod 360<β≤(α+θ2+360) mod 360−γ.

In the whole process of operation of the system, it is necessary to calculate the relative angle β between the wireless terminal 20 and the unmanned aerial vehicle and the yaw angle α in accordance with a certain time interval t, and then switch the corresponding antenna 11 in accordance with a calculation result. The time interval t is determined comprehensively in accordance with a timeslot allocation scheme of the wireless terminal 20 and the unmanned aerial vehicle, a position refresh rate of the positioning sensor, an attitude change of the unmanned aerial vehicle and the like. Moreover, switching time of the antennas 11 cannot fall within timeslot of transmitting and receiving data via wireless communication, which will otherwise lead to a communication error.

If it is M×N wireless communication, the mounting manner and the switching mechanism of the antennas 11 are similar to those described above. An interval angle at which the antennas 11 are arranged may change into 360°/N, and the combination of the antennas 11 is switched to N groups.

An antenna automatic alignment method according to a second implementation manner of the present disclosure is basically the same as that according to the first implementation manner, and their difference lies in that: the current feature information in the antenna automatic alignment method according to the second implementation manner is current position information of the plurality of antennas 11 and position information of the wireless terminal 20.

Figure 9:
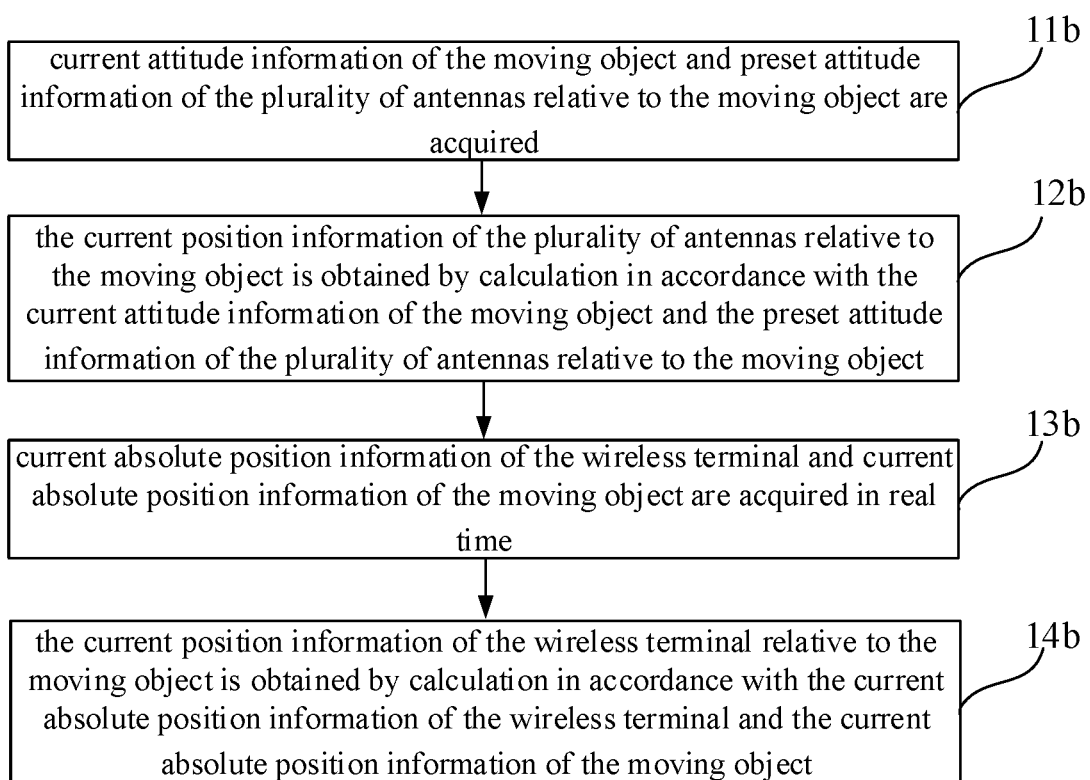
FIG. 9 is a flow chart of one embodiment of a first step of an antenna automatic alignment method according to a second implementation manner of the present disclosure.

As shown in FIG. 9, the step of acquiring current feature information of the plurality of antennas 11 relative to the wireless terminal 20 specifically includes:

Step 11b, current attitude information of the mobile object 10 and preset attitude information of the plurality of antennas 11 relative to the mobile object 10 are acquired.

Step 12b, the current position information of the plurality of antennas 11 relative to the mobile object 10 is obtained by calculation in accordance with the current attitude information of the mobile object 10 and the preset attitude information of the plurality of antennas 11 relative to the mobile object 10.

When the current position information of the wireless terminal 20 can be acquired in real time, for example, the wireless terminal 20 is provided thereon with a positioning sensor such as a GPS, the current position information of the wireless terminal 20 is acquired in real time through a positioning sensor of the mobile object 10, and step 1b further specifically includes:

Step 13b, current absolute position information of the wireless terminal 20 and current absolute position information of the mobile object 10 are acquired in real time.

Step 14b, the current position information of the wireless terminal 20 relative to the mobile object 10 is obtained by calculation in accordance with the current absolute position information of the wireless terminal 20 and the current absolute position information of the mobile object 10.

Figure 10:
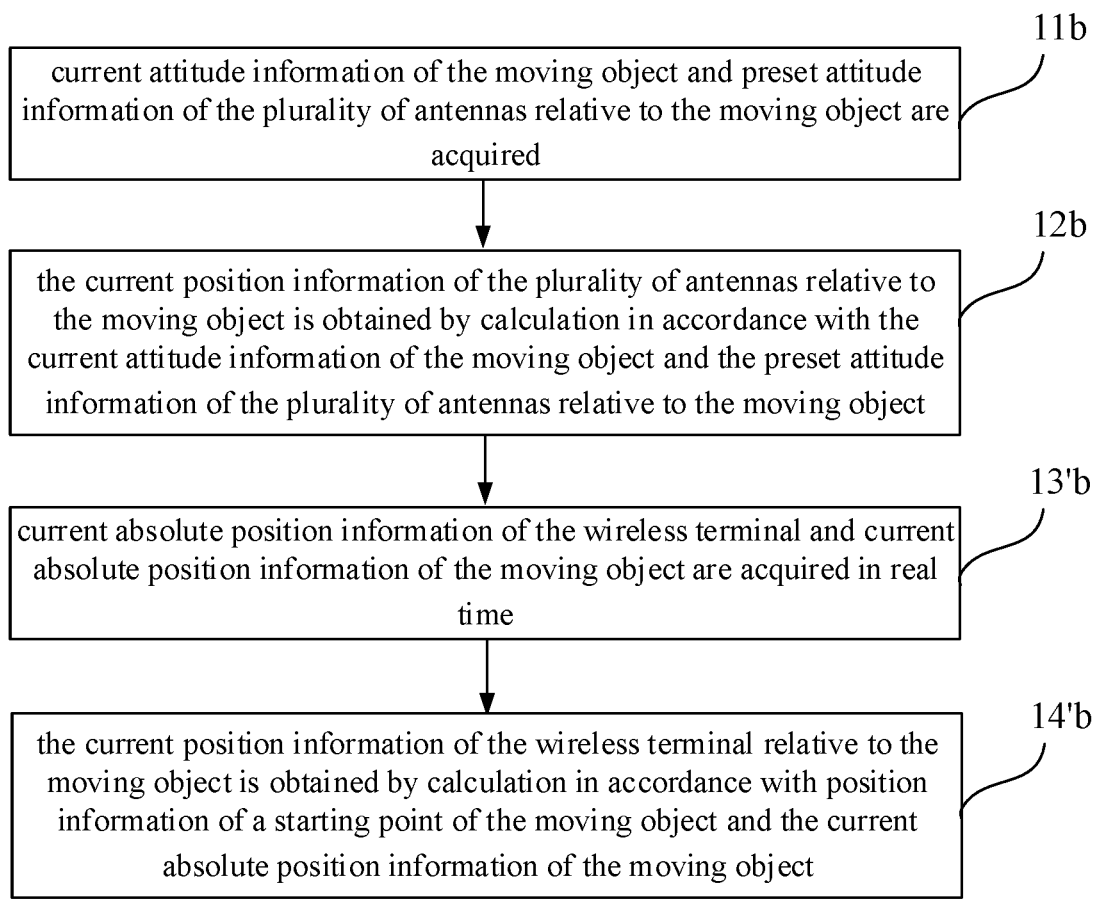
FIG. 10 is a flow chart of another embodiment of the first step of the antenna automatic alignment method shown in FIG. 9.

Referring to FIG. 10, when the current position information of the wireless terminal 20 cannot be acquired in real time, the step of acquiring current feature information of the plurality of antennas 11 relative to the wireless terminal 20 further specifically includes:

Step 13'b, current absolute position information of the mobile object 10 is acquired in real time.

Step 14'b, the current position information of the wireless terminal 20 relative to the mobile object 10 is obtained by calculation in accordance with position information of a take-off point of the mobile object 10 and the current absolute position information of the mobile object 10.

It should be noted that, if the mobile object 10 is an unmanned aerial vehicle, the take-off point of the mobile object 10 is a takeoff point of the unmanned aerial vehicle.

Figure 11:
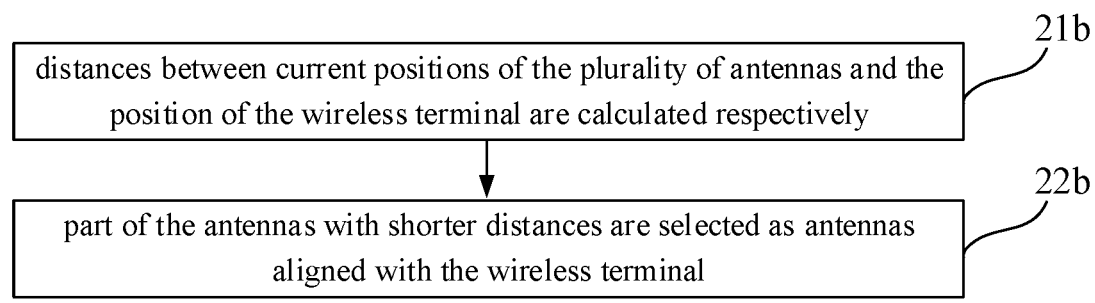
FIG. 11 is a flow chart of one embodiment of a second step of the antenna automatic alignment method according to the second implementation manner of the present disclosure.

Referring to FIG. 11, the step of selecting an antenna 11 available for current communication in accordance with the current feature information of the plurality of antennas 11 specifically includes:

Step 21b, distances between current positions of the plurality of antennas 11 and the position of the wireless terminal 20 are calculated respectively.

The distances between current positions of the plurality of antennas 11 and the position of the wireless terminal 20 can be calculated by acquiring current position information of the plurality of antennas 11 and position information of the wireless terminal 20.

Step 22b, part of the antennas 11 with shorter distances are selected as antennas 11 aligned with the wireless terminal 20.

Specifically, in this embodiment, the switching criterion is: the antennas 11 with shorter distances between current positions of the antennas 11 aligned with the wireless terminal 20 and the current position of the wireless terminal 20.

In accordance with the switching criterion, part of the antennas 11 with shorter distances therein are selected as antennas 11 aligned with the wireless terminal 20.

An antenna automatic alignment method according to a third implementation manner of the present disclosure is basically the same as that according to the first implementation manner, and their difference lies in that: the current feature information in the antenna automatic alignment method according to the third implementation manner is signal state information of the antennas 11.

The signal state information may be signal power of the antennas 11, signal strength of the antennas 11, signal quality of the antennas 11 and the like. In the following, the signal power of the antennas 11 is taken as an example to describe the signal state information of the antennas 11.

Figure 12:
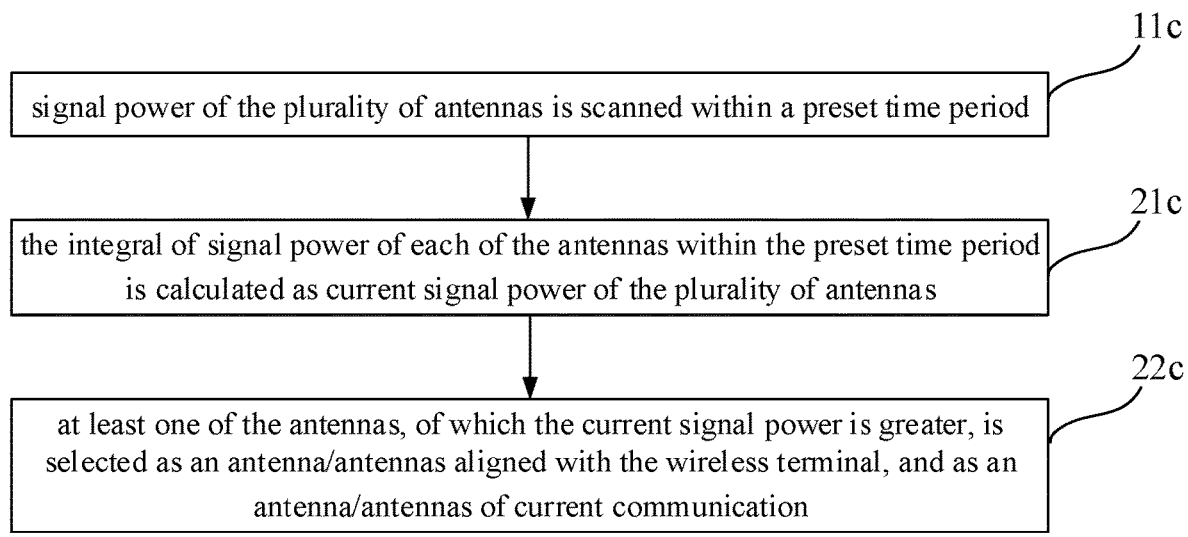
FIG. 12 is a specific flow chart of an antenna automatic alignment method according to a third implementation manner of the present disclosure.

Referring to FIG. 12 together, the step of acquiring current feature information of the plurality of antennas 11 relative to the wireless terminal 20 is specifically:

Step 11c, signal power of the plurality of antennas 11 is scanned within a preset time period.

The step of selecting an antenna 11 available for current communication in accordance with the current feature information of the plurality of antennas 11 specifically includes:

Step 21c, the integral of signal power of each of the antennas 11 within the preset time period is calculated as current signal power of the plurality of antennas 11.

Step 22c, at least one of the antennas 11, of which the current signal power is greater, is selected as an antenna/antennas 11 aligned with the wireless terminal 20, and as an antenna/antennas 11 of current communication.

As current signal power of the plurality of antennas is acquired, it is feasible to know the antenna/antennas 11 aligned with the wireless terminal 20 in accordance with the switching criterion.

Figure 13:
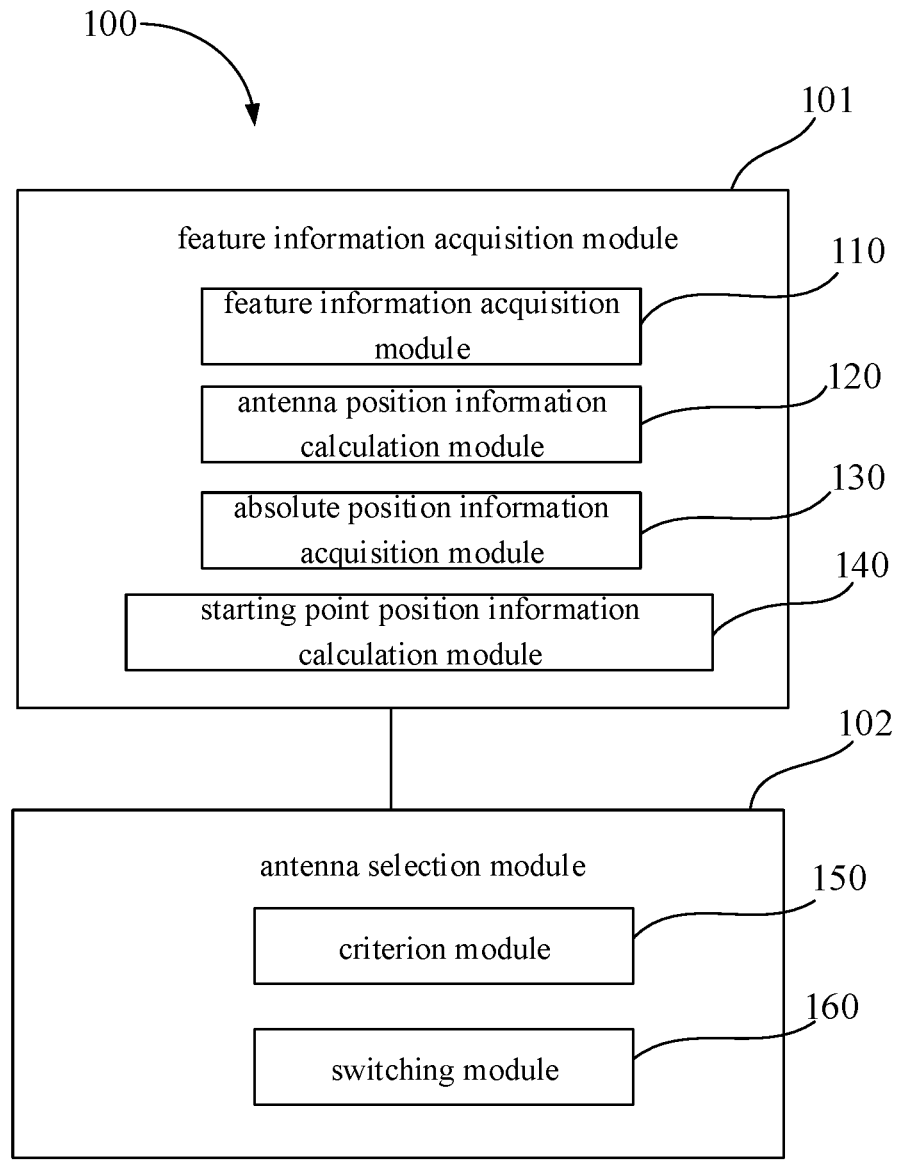
FIG. 13 is a modular diagram of an antenna automatic alignment system according to the first implementation manner of the present disclosure.

Referring to FIG. 13, an antenna automatic alignment system 100 according to the first implementation manner of the present disclosure is applied to a mobile object 10, the mobile object 10 including a plurality of antennas 11 used for establishing a communication link with a wireless terminal 20.

The mobile object 10 may be an unmanned aerial vehicle, for example, a rotor unmanned aerial vehicle, a fixed wing unmanned aerial vehicle or the like. The wireless terminal 20 may be a ground wireless terminal, for example, a remote controller, a UAV ground base station or the like, and the wireless terminal 20 may also be an aerial wireless terminal, for example, other aerial vehicles, a UAV aerial base station or the like.

The antennas 11 may be WiFi antennas, WiMAX antennas, COFDM antennas and the like. The communication link established between the plurality of antennas 11 and the wireless terminal 20 may be any point-to-point communication link. For example, the communication link may be a MIMO communication link.

The antenna automatic alignment system 100 includes a feature information acquisition module 101 and an antenna selection module 102. The feature information acquisition module 101 is used for acquiring, in real time, current feature information of the plurality of antennas 11, the plurality of antennas 11 including spare antennas. The antenna selection module 102 is used for selecting an antenna 11 available for current communication in accordance with the current feature information of the plurality of antennas 11.

The current feature information may include at least one of the followings: signal state information of the antennas 11, or relative position information of the antennas 11 relative to the wireless terminal 20. The signal state information may be signal power of the antennas 11, signal strength of the antennas 11, signal quality of the antennas 11 and the like. The relative position information of the antennas 11 relative to the wireless terminal 20 may include current position information of the plurality of antennas 11 relative to the mobile object 10, current position information of the wireless terminal 20 relative to the mobile object 10 and the like.

Figure 14:
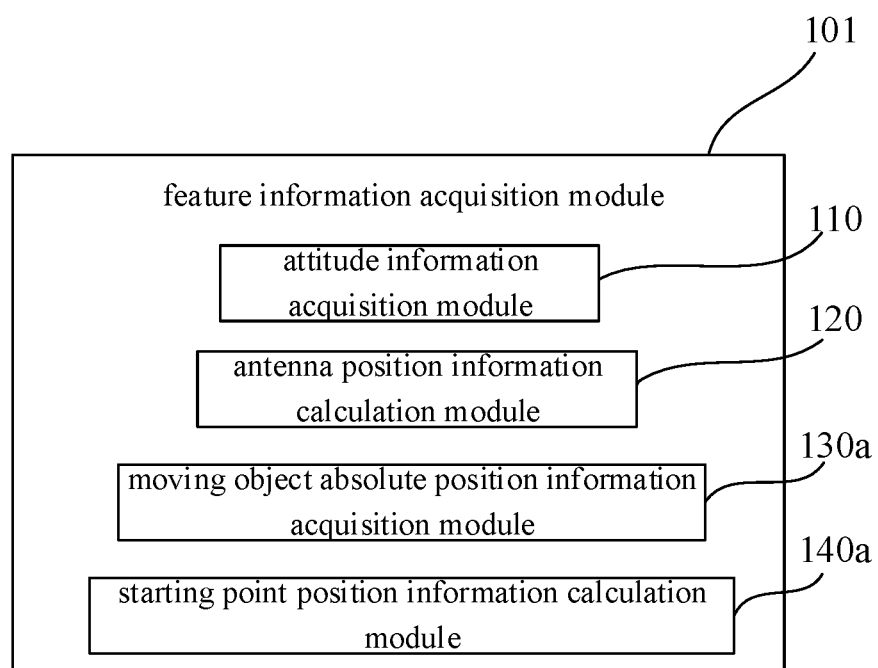
FIG. 14 is a modular diagram of one embodiment of a feature information acquisition module of the antenna automatic alignment system shown in FIG. 13.

In an embodiment, the current feature information is relative position information of the plurality of antennas 11 relative to the wireless terminal 20. Specifically, the current feature information includes current position information of the plurality of antennas 11 relative to the mobile object 10 and current position information of the wireless terminal 20 relative to the mobile object 10. As shown in FIG. 14, correspondingly, the feature information acquisition module 101 specifically includes:

An attitude information acquisition module 110 used for acquiring current attitude information of the mobile object 10 and preset attitude information of the plurality of antennas 11 relative to the mobile object 10.

An antenna position information calculation module 120 used for obtaining by calculation the current position information of the plurality of antennas 11 relative to the mobile object 10 in accordance with the current attitude information of the mobile object 10 and the preset attitude information of the plurality of antennas 11 relative to the mobile object 10.

When the mobile object 10 can acquire, in real time, current absolute position information of the wireless terminal 20, the feature information acquisition module 101 further specifically includes:

An absolute position information acquisition module 130 used for acquiring, in real time, current absolute position information of the wireless terminal 20 and current absolute position information of the mobile object 10.

A wireless terminal position information calculation module 140 used for obtaining by calculation the current position information of the wireless terminal 20 relative to the mobile object 10 in accordance with the current absolute position information of the wireless terminal 20 and the current absolute position information of the mobile object 10.

As shown in FIG. 14, when the mobile object 10 cannot acquire, in real time, current absolute position information of the wireless terminal 20, the feature information acquisition module 101 specifically includes:

a mobile object absolute position information acquisition module 130a used for acquiring, in real time, current absolute position information of the mobile object 10; and a take-off point position information calculation module 140a used for obtaining by calculation the current position information of the wireless terminal 20 relative to the mobile object 10 in accordance with position information of a take-off point of the mobile object 10 and the current absolute position information of the mobile object 10.

It should be noted that, if the mobile object 10 is an unmanned aerial vehicle, the take-off point of the mobile object 10 is a takeoff point of the unmanned aerial vehicle.

The antenna selection module 102 specifically includes a criterion module 150 and a switching module 160. The criterion module 150 is used for calculating whether or not the current feature information of the plurality of antennas 11 satisfies a switching criterion. The switching module 160 is used for selecting the antenna 11 available for current communication in accordance with the switching criterion.

The switching criterion may include at least one of the followings: selecting an antenna 11, of which the current feature information has a greater value, in the plurality of antennas 11, selecting an antenna 11, of which the current feature information has a smaller value, in the plurality of antennas 11, or selecting an antenna 11, of which the current feature information satisfies a threshold range, in the plurality of antennas 11.

Figure 15:
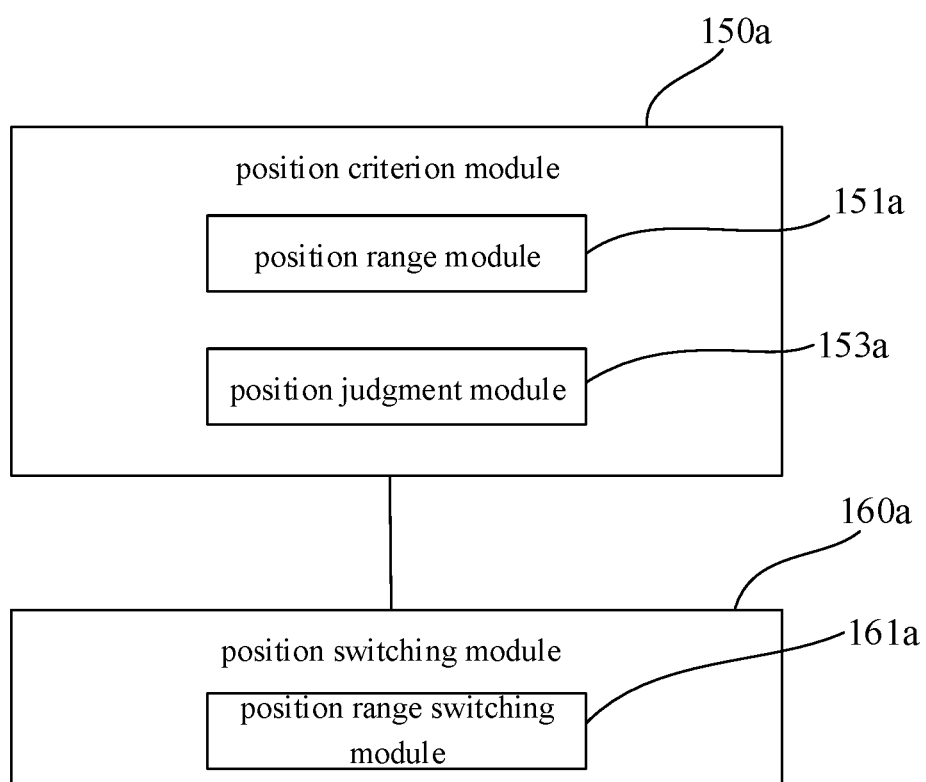
FIG. 15 is a modular diagram of one embodiment of an antenna selection module of the antenna automatic alignment system shown in FIG. 13.

As shown in FIG. 15, correspondingly, the antenna selection module 102 specifically includes:

A position criterion module 150a used for calculating whether or not the current position information of the plurality of antennas 11 relative to the mobile object 10 and the current position information of the wireless terminal 20 relative to the mobile object 10 satisfy a switching criterion.

A position switching module 160a used for selecting the antenna 11 available for current communication in accordance with the switching criterion.

The position criterion module 150a specifically includes:

A position range module 151a used for constructing a plurality of position ranges in accordance with the current position information of the plurality of antennas 11 relative to the mobile object.

A position judgment module 153a used for calculating whether or not the plurality of position ranges cover the current position information of the wireless terminal 20 relative to the mobile object 10.

The position switching module 160a specifically includes:

A position range switching module 161a used for selecting the antenna 11, which corresponds to one position range that covers the current position information of the wireless terminal 20 relative to the mobile object 10, as an antenna 11 aligned with the wireless terminal 20.

Further, in order to prevent the mobile object 10 from frequent switching in the locations of the antennas 11 that affects normal communication, the position ranges include a coordinate range that takes the current position information of the plurality of antennas 11 relative to the mobile object 10 as an end point and a preset protection range.

Figure 16:
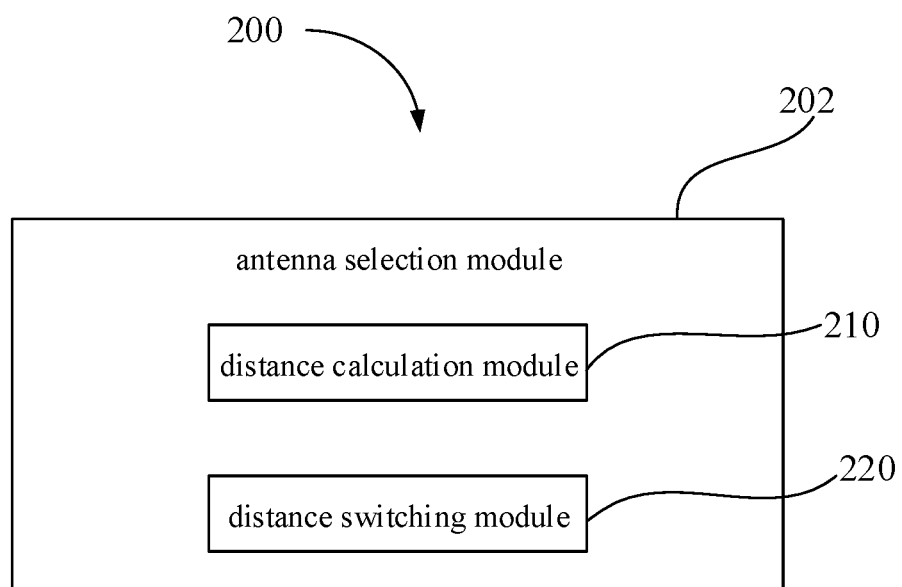
FIG. 16 is a specific modular diagram of an antenna selection module of an antenna automatic alignment system according to the second implementation manner of the present disclosure.

Referring to FIG. 16, an antenna automatic alignment system 200 according to the second implementation manner of the present disclosure is basically similar to the antenna automatic alignment system 100 according to the first implementation manner, and their difference lies in that: an antenna selection module 202 of the antenna automatic alignment system 200 specifically includes a distance calculation module 210 and a distance switching module 220.

The distance calculation module 210 is used for calculating distances between current positions of the plurality of antennas 11 and the current position of the wireless terminal 20 respectively.

The distance switching module 220 is used for selecting part of the antennas 11 with shorter distances as antennas 11 aligned with the wireless terminal 20.

An antenna automatic alignment system 300 according to the third implementation manner of the present disclosure is basically similar to the antenna automatic alignment system 100 according to the first implementation manner, and their difference lies in that: the current feature information is signal state information of the antennas 11. The signal state information may be signal power of the antennas 11, signal strength of the antennas 11, signal quality of the antennas 11 and the like.

Figure 17:
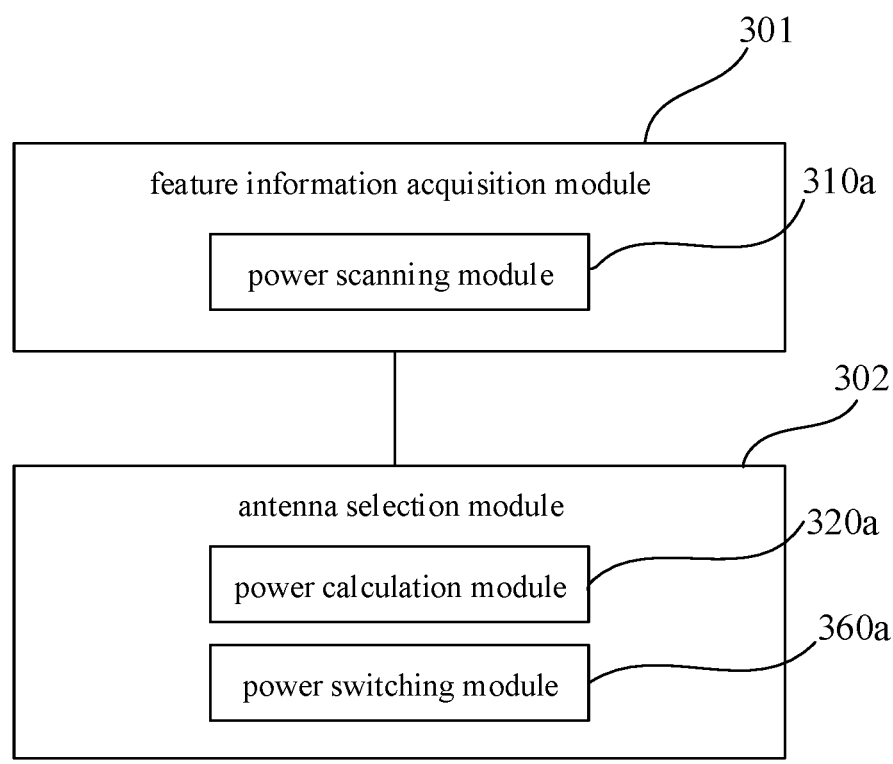
FIG. 17 is a specific modular diagram of an antenna automatic alignment system according to the third implementation manner of the present disclosure.

As shown in FIG. 17, correspondingly, a feature information acquisition module 301 specifically includes:

A power scanning module 310a used for scanning signal power of the plurality of antennas 11 within a preset time period.

An antenna selection module 302 specifically includes:

A power calculation module 320a used for calculating the integral of signal power of each of the antennas 11 within the preset time period as current signal power of the plurality of antennas 11.

A power switching module 360a used for selecting at least one of the antennas 11, of which the current signal power is greater, as an antenna/antennas 11 aligned with the wireless terminal 20, and as an antenna/antennas of current communication.

Based on the aforementioned antenna alignment method, the present disclosure further provides a mobile object 10 to which the antenna alignment method is applied. The mobile object 10 may be a ground mobile object, for example, a ground remote control tank or the like; and may also be an aerial mobile object, for example, an unmanned aerial vehicle or the like. In the embodiment described below, the specific structure of the mobile object 10 is described by taking an unmanned aerial vehicle as an example.

Figure 18:
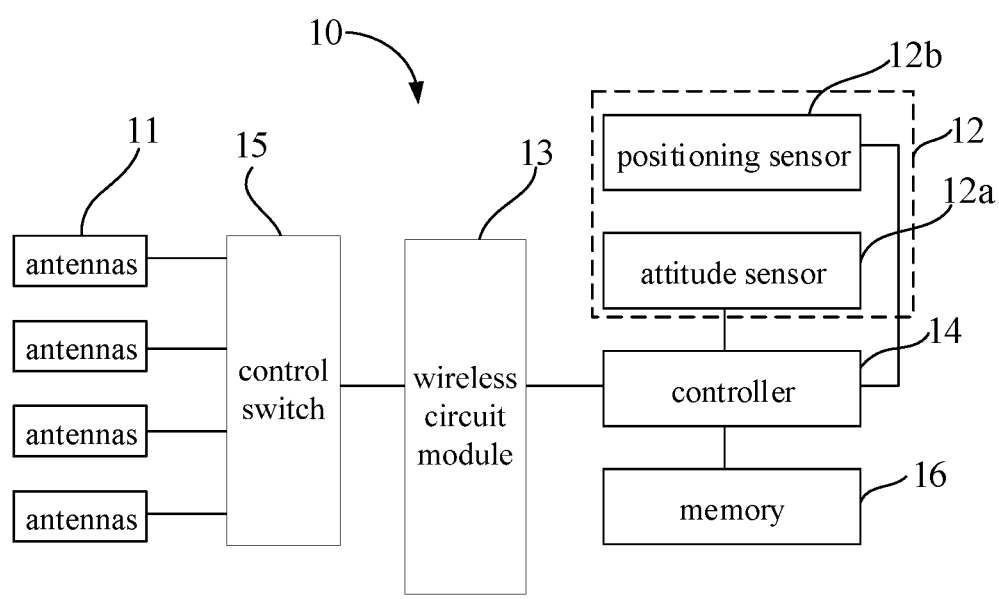
FIG. 18 is a schematic circuit diagram of a mobile object according to an implementation manner of the present disclosure.

Referring to FIG. 1, FIG. 2, and FIG. 18 together, the mobile object 10 in the implementation manner includes a plurality of antennas 11, a feature information acquisition device 12, a wireless circuit module 13 and a controller 14.

The plurality of antennas 11 is used for establishing a communication link with a wireless terminal 20, wherein the plurality of antennas 11 include spare antennas. The communication link is a point-to-point communication link. For example, the communication link may be a MIMO communication link. The antennas 11 may be WiFi antennas, WiMAX antennas, COFDM antennas and the like.

The numbers of the spare antennas and the current communication antennas of the plurality of antennas 11 may be designed in accordance with actual needs. For example, in the embodiment illustrated, the number of the spare antennas is equal to the number of the current communication antennas. Specifically, the number of the spare antennas and the number of the current communication antennas are both two.

The current feature information may include at least one of the followings: signal state information of the antennas 11, or relative position information of the antennas 11 relative to the wireless terminal 20. The signal state information may be signal power of the antennas 11, signal strength of the antennas 11, signal quality of the antennas 11 and the like. The relative position information of the plurality of antennas 11 relative to the wireless terminal 20 may include current position information of the plurality of antennas 11 relative to the mobile object 10, current position information of the wireless terminal 20 relative to the mobile object 10 and the like.

The feature information acquisition device 12 is used for acquiring, in real time, current feature information of the plurality of antennas 11.

The specific structure of the feature information acquisition device 12 may be designed in accordance with the current feature information. For example, in an embodiment, the current feature information is relative position information of the plurality of antennas 11 relative to the wireless terminal 20, and correspondingly, the feature information acquisition device 12 includes an attitude sensor 12a used for acquiring current attitude information of the mobile object 10, and a positioning sensor 12b used for acquiring, in real time, current absolute position information of the wireless terminal 20 and current absolute position information of the mobile object 10.

In other embodiments, the current feature information is signal power of the antennas 11, and correspondingly, the feature information acquisition device 12 includes a wireless circuit module 13 used for scanning signal power of the plurality of antennas 11 within a preset time period. Specifically, the controller 14 is in communication connection with the plurality of antennas 11 through the wireless circuit module 13 and transmits and receives wireless signals through the wireless circuit module 13.

The controller 14 is in communication connection with the antennas 11 and the feature information acquisition device 12, and used for selecting an antenna 11 available for current communication in accordance with current feature information of the plurality of antennas 11.

Specifically, the mobile object 10 further includes a control switch 15 electrically connected between the wireless circuit module 13 and the plurality of antennas 11, and the controller 14 is specifically used for calculating whether or not the current feature information of the plurality of antennas 11 satisfies a switching criterion and selecting, through the control switch 15, the antenna 11 available for current communication in accordance with the switching criterion.

The switching criterion includes at least one of the followings: selecting an antenna 11, of which the current feature information has a greater value, in the plurality of antennas 11, selecting an antenna 11, of which the current feature information has a smaller value, in the plurality of antennas 11, and selecting an antenna 11, of which the current feature information satisfies a threshold range, in the plurality of antennas 11.

The function of the controller 14 may be designed in accordance with the current feature information of the antennas 11. For example, in an embodiment, the current feature information is relative position information of the plurality of antennas 11 relative to the wireless terminal 20. The mobile object 10 further includes a memory 16 used for storing preset attitude information of the plurality of antennas 11 relative to the mobile object 10, and the feature information acquisition device 12 includes an attitude sensor 12a used for acquiring current attitude information of the mobile object 10 and a positioning sensor 12b used for acquiring, in real time, current absolute position information of the wireless terminal 20 and current absolute position information of the mobile object 10. The controller 14 obtains by calculation the current position information of the plurality of antennas 11 relative to the mobile object 10 in accordance with the current attitude information of the mobile object 10 and the preset attitude information of the plurality of antennas 11 relative to the mobile object 10. At the same time, the controller 14 obtains by calculation the current position information of the wireless terminal 20 relative to the mobile object 10 in accordance with the current absolute position information of the wireless terminal 20 and the current absolute position information of the mobile object 10.

If it is difficult for the positioning sensor 12b of the mobile object 10 to acquire information of the wireless terminal 20, the memory 16 is further used for storing position information of a take-off point of the mobile object 10, and the controller 14 obtains by calculation the current position information of the wireless terminal 20 relative to the mobile object 10 in accordance with the position information of the take-off point of the mobile object 10 and the current absolute position information of the mobile object 10.

It should be noted that, if the mobile object 10 is an unmanned aerial vehicle, the take-off point of the mobile object 10 is a takeoff point of the unmanned aerial vehicle.

The controller 14 calculates whether or not the current position information of the plurality of antennas 11 relative to the mobile object 10 and the current position information of the wireless terminal 20 relative to the mobile object 10 satisfy a switching criterion, and selects, through the control switch 15, the antenna 11 available for current communication.

The function of calculating whether the current feature information of the plurality of antennas 11 satisfies a switching criterion by the controller 14 may be designed in accordance with actual demands. For example, specifically in the embodiment illustrated, the controller 14 is used for constructing a plurality of position ranges in accordance with the current position information of the plurality of antennas 11 relative to the mobile object, and calculating whether or not the plurality of position ranges cover the current position information of the wireless terminal 20 relative to the mobile object 10, to judge whether or not the current position information of the plurality of antennas 11 relative to the mobile object 10 and the current position information of the wireless terminal 20 relative to the mobile object 10 satisfy a switching criterion.

The function of selecting an antenna 11 aligned with the wireless terminal 20 in accordance with the switching criterion by the controller 14 may be designed in accordance with actual demands. For example, specifically in the embodiment illustrated, the controller 14 is further used for selecting the antenna 11, which corresponds to one position range that covers the current position information of the wireless terminal 20 relative to the mobile object 10, as an antenna 11 aligned with the wireless terminal 20.

Further, in order to prevent the mobile object 10 from frequently switching in coordinate positions of the antennas 11, the position ranges include a coordinate range that takes the current position information of the plurality of antennas 11 relative to the mobile object 10 as an end point and a preset protection range.

In other embodiments, when the switching criterion is based on distances between current positions of the antennas 11 and the position of the wireless terminal 20, the function of calculating whether the current feature information of the plurality of antennas 11 satisfies a switching criterion by the controller 14 may be designed as follows: the controller 14 is used for calculating distances between current positions of the plurality of antennas 11 and the position of the wireless terminal 20 respectively, and selecting part of the antennas 11 with shorter distances as antennas 11 aligned with the wireless terminal 20.

In other embodiments, when the current feature information is signal state information of the antennas 11, the function of the controller 14 is designed as follows: the controller 14 is used for calculating whether or not the signal state information of the plurality of antennas 11 satisfies a switching criterion and selecting an antenna 11 available for current communication in accordance with the switching criterion.

For example, the signal state information may be signal power of the antennas 11. The mobile object 10 further includes a wireless circuit module 13 used for scanning signal power of the plurality of antennas 11 within a preset time period, and the controller 14 calculates the integral of signal power of each of the antennas 11 within the preset time period as current signal power of the plurality of antennas 11. The controller 14 selects at least one of the antennas 11, of which the current signal power is greater, as an antenna/antennas 11 aligned with the wireless terminal 20, and as an antenna/antennas of current communication.

The wireless terminal 20 may be a ground wireless terminal, a UAV ground base station, a remote controller or the like, and may also be an aerial wireless terminal, for example, a UAV aerial base station, other aerial vehicles or the like. In this embodiment, the remote controller is taken as an example for description.

Figure 19:
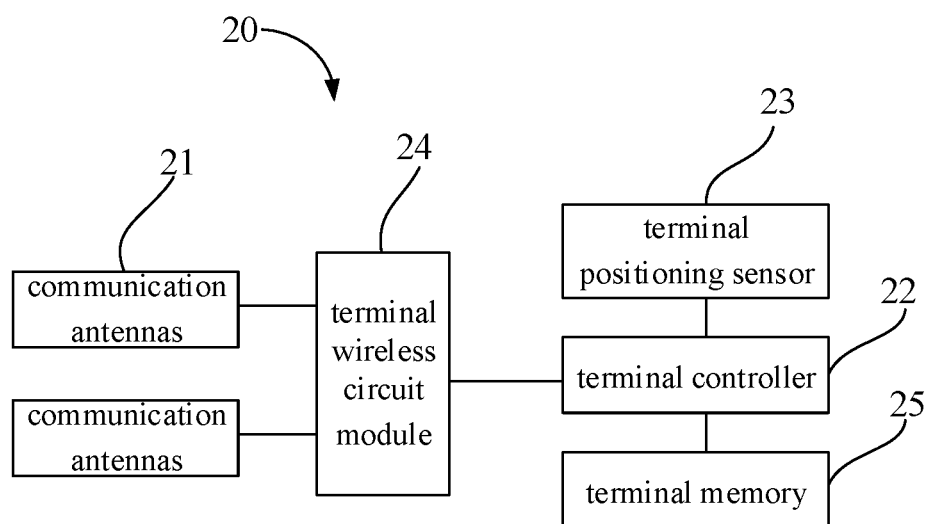
FIG. 19 is a schematic circuit diagram of a mobile terminal in a communication connection with the mobile object shown in FIG. 18.

Referring to FIG. 19, the wireless terminal 20 includes a plurality of communication antennas 21, a terminal controller 22, a terminal positioning sensor 23, a terminal wireless circuit module 24, and a terminal memory 25.

The number of the communication antennas 21 may be designed in accordance with demands. For example, in the embodiment illustrated, the number of the communication antennas 21 is two, which are constructed into a 2×2 MIMO communication link with the antennas 11 of the mobile object 10.

The terminal controller 22 is in communication connection with the communication antennas 21 through the terminal wireless circuit module 24, and controls, through the wireless circuit module 13, the communication antennas 21 to transmit and receive data.

The terminal positioning sensor 23 is in a communication connection with the terminal controller 22 used for sensing current position information of the wireless terminal 20. The terminal positioning sensor 23 may also be a GPS, a BeiDou satellite positioning sensor or the like.

The terminal memory 25 is connected with the terminal controller 22 used for storing data. For example, the terminal memory 25 is used for storing data transmitted via a communication link established by the current communication antennas 21 of the mobile object 10 and the communication antennas 21 of the wireless terminal 20 and the like.

Based on the aforementioned antenna automatic alignment method, the present disclosure further provides a controller, used for performing the calculation, judgment, selection and other steps in the aforementioned antenna automatic alignment method.

In the several embodiments provided in the present disclosure, it should be understood that the related devices and methods disclosed may be implemented in another manner. For example, the device embodiments described above are merely schematic, for example, division of the modules or units is merely division of logical functions, and division in another manner may exist in actual implementation, for example, a plurality of units or assemblies may be combined or integrated into another system, or some features may be omitted or not performed. In addition, the mutual coupling or direct coupling or communication connection displayed or discussed may be implemented by using some interfaces, and the indirect coupling or communication connection between the devices or units may be electrical, mechanical or in another form.

The units described as separate components may be or may not be physically separate, and components displayed as units may be or may not be physical units, may be located in one position, or may be distributed on a plurality of network units. Some or all of the units may be selected according to actual needs to achieve the objectives of the solution of the embodiment.

In addition, functional units in the embodiments of the present disclosure may be integrated into one processing unit, or each of the units may exist alone physically, or two or more units are integrated into one unit. The aforementioned integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, embodiments of the present disclosure may be implemented in a form of a software product. The computer software product is stored in a storage medium, and includes several instructions used for causing a computer processor to perform all or a part of the steps of the methods described in the embodiments of the present disclosure. The foregoing storage medium includes: any medium that can store a program code, such as a USB flash drive, a portable hard disk, a Read-Only Memory (ROM), a Random Access Memory (RAM), a magnetic disk, or an optical disc.

The foregoing disclosure is merely illustrative of the embodiments of the disclosure but not intended to limit the scope of the disclosure. Any equivalent modifications to a structure or process flow, which are made without departing from the specification and the drawings of the disclosure, and a direct or indirect application in other relevant technical fields, shall also fall into the scope of the disclosure.

What is claimed is:

1. A multi-rotor unmanned aerial vehicle (UAV) system comprising:
a remote controller including:
two first wireless antennas;
a terminal positioning sensor configured to sense current terminal position information of the remote controller; and
a terminal controller coupled to the two first wireless antennas and the terminal positioning sensor; and
a multi-rotor UAV comprising:
two landing stands;
a plurality of second wireless antennas arranged at the two landing stands, the plurality of second wireless antennas include three or more second wireless antennas;
a position sensor configured to acquire current UAV position information; and
a UAV controller coupled to the plurality of second wireless antennas and configured to:
obtain current terminal position information;
obtain current UAV position information;
determine current remote controller relative position information of the remote controller relative to the UAV according to the current terminal position information and the current UAV position information; and
control communication between the UAV and the remote controller according to the current remote controller relative position information, including:
selecting two of the plurality of second wireless antennas as communication wireless antennas to establish a 2×2 multi-input-multi-output (MIMO) communication link with the two first wireless antennas to conduct the communication between the UAV and the remote controller, unselected one or more of the plurality of second wireless antennas being one or more spare wireless antennas not currently used in the communication between the UAV and the remote controller;
constructing a position range of the two communication wireless antennas; and
controlling to not switch to the one or more spare wireless antennas to establish the communication between the UAV and the remote controller in response to the current remote controller relative position information indicating that a current remote controller relative position has moved out of the position range but is within a protection range outside the position range.

2. The UAV system of claim 1, wherein the 2×2 MIMO communication link is a visual range point-to-point communication link.

3. The UAV system of claim 1, wherein each of the two first wireless antennas and the plurality of second wireless antennas includes a WiFi antenna, a worldwide interoperability for microwave access (WiMAX) antenna, or a coded orthogonal frequency-division multiplexing (COFDM) antenna.

4. The UAV system of claim 1, wherein the the one or more spare wireless antennas include two spare wireless antennas not currently used in the communication between the UAV and the remote controller.

5. The UAV system of claim 4, wherein the two communication wireless antennas and the two spare wireless antennas are of a same type.

6. The UAV system of claim 1, wherein the controller is further configured to select the two of the plurality of second wireless antennas by:
determining whether the current remote controller relative position information satisfies a switching criterion; and selecting the two of the plurality of second wireless antennas to establish the 2×2 MIMO communication link in accordance with the switching criterion.

7. The UAV system of claim 1, wherein:
the UAV further includes an attitude sensor configured to acquire current UAV attitude information; and
the UAV controller is further configured to:
receive the current UAV attitude information;
determine current antenna relative position information of the plurality of second wireless antennas relative to the UAV based on the current UAV attitude information and preset antenna attitude information of the plurality of second wireless antennas relative to the UAV; and
control the communication between the UAV and the remote controller according to the current remote controller relative position information and the current antenna relative position information.

8. The UAV system of claim 7, wherein:
the plurality of second wireless antenna include four second wireless antennas; and
the UAV controller is further configured to select two of the four second wireless antennas as the communication wireless antennas, unselected two of the four second wireless antennas being two spare wireless antennas not currently used in the communication between the UAV and the remote controller.

9. The UAV system of claim 8, wherein the UAV controller is further configured to select the two of the four second wireless antennas by:
determining whether the current remote controller relative position information and the current antenna relative position information satisfy a switching criterion; and
selecting the two of the four second wireless antennas to establish the 2×2 MIMO communication link in accordance with the switching criterion.

10. The UAV system of claim 9, wherein the UAV controller is further configured to determine whether the current remote controller relative position information and the current antenna relative position information satisfy the switching criterion by:
constructing a plurality of position ranges in accordance with the current antenna relative position information, the plurality of position ranges including the position range of the two communication wireless antennas; and
determining whether at least one of the plurality of position ranges covers the current remote controller relative position information.

11. The UAV system of claim 10, wherein the UAV controller is further configured to select the two of the four second wireless antennas that correspond to one of the at least one of the position ranges that covers the current remote controller position information.

12. The UAV system of claim 10, wherein the UAV controller is further configured to construct the position ranges by constructing a coordinate range, one end point of the coordinate range corresponding to current position information of one of the four second wireless antennas relative to the UAV and another end point of the coordinate range corresponding to current position information of another one of the four second wireless antennas relative to the UAV.

13. A communication method comprising:
obtaining current terminal position information from a remote controller;
receiving current UAV position information acquired by a position sensor of a multi-rotor UAV;
determining current remote controller relative position information of the remote controller relative to the UAV according to the current terminal position information and the current UAV position information; and
controlling communication between the UAV and the remote controller according to the current remote controller relative position information, including:
selecting two of a plurality of second wireless antennas arranged at two landing stands of the UAV as communication wireless antennas to establish a 2×2 multi-input-multi-output (MIMO) communication link with two first wireless antennas of the remote controller to conduct the communication between the UAV and the remote controller, unselected one or more of the plurality of second wireless antennas being one or more spare wireless antennas not currently used in the communication between the UAV and the remote controller;
constructing a position range of the two communication wireless antennas; and
controlling to not switch to the one or more spare wireless antennas to establish the communication between the UAV and the remote controller in response to the current remote controller relative position information indicating that a current remote controller relative position has moved out of the position range but is within a protection range outside the position range.

14. The method of claim 13, wherein the 2×2 MIMO communication link is a visual range point-to-point communication link.

15. The method of claim 13, further comprising:
receiving current UAV attitude information acquired by an attitude sensor of the UAV; and
determining current antenna relative position information of the plurality of second wireless antennas relative to the UAV based on the current UAV attitude information and preset antenna attitude information of the plurality of second wireless antennas relative to the UAV;
wherein controlling the communication between the UAV and the remote controller includes controlling the communication according to the current remote controller relative position information and the current antenna relative position information.

16. The method of claim 15,
wherein the plurality of second wireless antenna include four second wireless antennas;
the method further comprising:
selecting two of four second wireless antennas of the UAV as the communication wireless antennas;
wherein unselected two of the four second wireless antennas are two spare wireless antennas not currently used in the communication between the UAV and the remote controller.

17. The method of claim 16, wherein selecting the two of the four second wireless antennas includes:
determining whether the current remote controller relative position information and the current antenna relative position information satisfy a switching criterion; and
selecting the two of the four second wireless antennas to establish the 2×2 MIMO communication link in accordance with the switching criterion.

18. The method of claim 17, wherein determining whether the current remote controller relative position information and the current antenna relative position information satisfy the switching criterion includes:

constructing a plurality of position ranges in accordance with the current antenna relative position information, the plurality of position ranges including the position range of the two communication wireless antennas; and determining whether at least one of the plurality of position ranges covers the current remote controller relative position information.

19. The method of claim 18, wherein constructing the position ranges includes constructing a coordinate range, one end point of the coordinate range corresponding to current position information of one of the four second wireless antennas relative to the UAV and another end point of the coordinate range corresponding to current position information of another one of the four second wireless antennas relative to the UAV.

* * * * *